(12) United States Patent
Smithwick (10) Patent No.: US 9,678,476 B2
(45) Date of Patent: *Jun. 13, 2017

(54) SCALABLE AND TILEABLE HOLOGRAPHIC DISPLAYS

(71) Applicant: DISNEY ENTERPRISES, INC., Burbank, CA (US)

(72) Inventor: Quinn Y. Smithwick, Pasadena, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/051,135

(22) Filed: Feb. 23, 2016

(65) Prior Publication Data

US 2016/0170372 A1    Jun. 16, 2016

Related U.S. Application Data

(62) Division of application No. 14/068,371, filed on Oct. 31, 2013, now Pat. No. 9,304,492.

(51) Int. Cl.
*G03H 1/08* (2006.01)
*G02B 5/32* (2006.01)
(Continued)

(52) U.S. Cl.
CPC .......... *G03H 1/2294* (2013.01); *G03H 1/2205* (2013.01); *G03H 1/268* (2013.01);
(Continued)

(58) Field of Classification Search
CPC .... G03H 1/2294; G03H 1/08; G03H 2210/30; G03H 1/2286; G03H 1/26; G03H 1/0005; G03H 2001/0224; G03H 1/0248; G03H 2001/2242; G03H 2222/34; G03H 2225/55; G03H 2225/60; G03H 1/265; G03H 2001/2236; G03H 2001/2223; G03H 2001/2284; G03H 2001/0413; G03H 2210/22; G03H 2226/02; G03H 1/04;
(Continued)

(56) References Cited

U.S. PATENT DOCUMENTS

| | | | |
|---|---|---|---|
| 2010/0079831 A1* | 4/2010 | Renaud-Goud | G03H 1/2294 359/9 |
| 2010/0271676 A1* | 10/2010 | Renaud-Goud | G03H 1/22 359/9 |
| 2015/0116798 A1 | 4/2015 | Smithwick | |

* cited by examiner

*Primary Examiner* — Jade R Chwasz
(74) *Attorney, Agent, or Firm* — Marsh Fischmann & Breyfogle LLP; Kent A. Lembke (57) ABSTRACT

A holographic display system for generating a super hologram with full parallax in different fields of view in the horizontal and vertical directions. The display system includes assemblies or subsystems each adapted to combine holographic displays and coarse integral displays to produce or display a coarse integral hologram. The display system is adapted to combine such displays or display systems to add more detail or information. For example, the display system can be assembled as if it were made up of "holographic bricks" that can be stacked and combined to provide a unique image/output. Briefly, the display system described herein teaches techniques for combining coarse integral holographic (CIH) displays in a seamless and scalable manner, e.g., a display system where multiple spatial light modulators (SLMs) can be placed or provided behind coarse integral optics.

17 Claims, 9 Drawing Sheets

(51) Int. Cl.
*G03H 1/28* (2006.01)
*G03H 1/22* (2006.01)
*G03H 1/26* (2006.01)

(52) U.S. Cl.
CPC ............... *G03H 2001/221* (2013.01); *G03H 2001/2239* (2013.01); *G03H 2001/2242* (2013.01); *G03H 2210/30* (2013.01); *G03H 2222/36* (2013.01); *G03H 2223/19* (2013.01); *G03H 2225/60* (2013.01)

(58) Field of Classification Search
CPC .... G03H 1/10; G03H 1/28; G03H 2001/0426; G03H 2001/0421; G03H 1/2205; G03H 1/268; G03H 2001/221; G03H 2001/2239; G03H 2222/36; G03H 2223/19
USPC ..... 359/9, 10, 11, 21, 22, 24, 25, 28, 32, 35
See application file for complete search history.

SCALABLE AND TILEABLE HOLOGRAPHIC DISPLAYS

CROSS REFERENCE TO RELATED APPLICATIONS

This application is a divisional of U.S. patent application Ser. No. 14/068,371, filed Oct. 31, 2013, which is incorporated herein by reference in its entirety.

BACKGROUND

1. Field of the Description

The present invention relates, in general, to autostereoscopic displays and to holography and to holographic displays, and, more particularly, to displays adapted to facilitate scaling and tiling (or otherwise combining) such holographic displays, e.g., scalable and tileable coarse integral holographic displays.

2. Relevant Background

Holography is a technique that enables three-dimensional (3D) images to be generated, recorded, and later displayed. It typically involves the use of a laser, interference, diffraction, light intensity recording, and suitable illumination of the recording. The image changes as the position and orientation of the viewing system changes in exactly the same way as if the object were still present, thereby making the image appear in 3D. The holographic recording itself is not an image as it is made up of an apparently random structure of varying intensity, density, or profile.

As the demand for 3D displays rapidly grows, holographic displays are considered by many within the 3D entertainment industry as the ultimate goal of 3D displays. Such high regard is held for these devices because holographic displays are capable of displaying all the 3D cues of a real scene to a viewer. Unfortunately, to date, designing and fabricating holographic displays have proven difficult due to one or more challenges that have limited display size, field of view, frame rate, and/or prevented providing both horizontal and vertical parallax.

In this regard, to create a large holographic display with a wide field of view (fov), the pitch of the display's spatial light modulator (SLM) must be fine (e.g., less than 1 micrometer ($\mu m$) and more typically less than 0.5 $\mu m$ for an approximately 30° fov) over a large area (e.g., 127 millimeters (mm) by 100 mm or the like). Unfortunately, the pitches of common SLMs, such as digital mirror devices (DMDs) or liquid crystal on silicon (LCOS) devices, are typically only as coarse as about 5 to 10 $\mu m$ and are the same horizontally and vertically, providing only 1° to 3° fov. Further, the pitches are only maintained over small areas in these devices such as over 20 mm by 20 mm. Demagnifying optics can be used to increase the pitch and field of view but at the generally unacceptable expense of the image size (and vice versa) due to the Lagrange Invariant (i.e., for an optical system of only lenses, the product of the image size and ray angle is constant).

In some attempts to provide an improved holographic display, multiple SLMs have been tiled together to increase either the size or field of view of the hologram. With simple spatial tiling of multiple SLMs to increase the size of the hologram, however, there are noticeable seams in the holographic image due to gaps between the SLMs from the borders and electronics. Spatial tiling of a single SLM has also been achieved using replication optics or using 2-axis scanners. Gaps and misalignments in the spatial tiling appear at the hologram plane and visually interfere with and confuse the 3D imagery. Multiple SLMs have also been arranged in an arc, with precision optical mounts, to increase the field of view. The holographic images overlap in the center of the arc a far distance from the SLMs, with a corresponding reduction in the holographic image's resolution the further the distance from the SLM. Several of these systems use an asymmetric diffusing screen, producing horizontal parallax only (HPO) images. Accousto-optical modulators (AOMs) are capable of providing traveling acoustic waves of pitches of about 5 $\mu m$ over larger lengths. These large lengths can be arranged into widths of about 1 meter by heights of about 100 mm. However, to cancel the motion of the traveling waves, descanning optics and scanners are required. Also, other optics may be required to create higher pitches at the expense of display width. Further, the acoustic waves only diffract in one direction, and the resulting hologram is necessarily HPO.

Due to the horizontal arrangement of the human eyes, horizontal parallax is more important than vertical parallax for binocular stereopsis and motion parallax. This fact is often used in horizontal parallax only (HPO) holographic displays to reduce computation and data bandwidth requirements compared to full parallax holographic displays. However, the appearance of the HPO hologram does not change with vertical motion of the viewer and their viewing location or point of view. In other words, a single viewer may move their head up and down or vertically (e.g., be sitting or squatting and then stand up), and the hologram's appearance would not change as would a true 3D object. In some artistic and entertainment applications, especially those provided for single stationary viewers, the loss of vertical parallax may be acceptable.

However, vertical parallax is important to fix absolute position in space. In many 3D display implementations, the loss of vertical parallax is not acceptable, which has led some experts in the 3D display industry to argue that a holographic display that is HPO is a "non-starter." For example, in implementations involving interaction with the hologram or involving multiple viewers that collaborate (e.g., point to or interact with the same location on the holographic image), the holographic display will be ineffective unless there is at least a small amount of vertical parallax. Such "limited vertical parallax" may be necessary for the viewers to see or experience a consistent scene from differing points of view. Due to human kinetics (e.g., it is easier for humans to shift their views left and right than up and down), the amount of desirable vertical parallax is often much lower than a desirable amount of horizontal parallax.

Hence, there is a need for holographic displays or holographic display systems that address some of these challenges. Preferably, such new holographic displays would provide a relatively large 3D image or hologram and would provide some amount of vertical parallax (e.g., provide limited vertical parallax). An issue, though, facing such development is that providing different amounts of information and fields of view in the horizontal and vertical directions is difficult with current full parallax holographic displays. With common square pixel SLMs, the horizontal and vertical pitches and, therefore, the fields of view are the same (unless anamorphic optics are used, which often is not desirable due to astigmatic aberrations, cost, manufacturing and design complexity, and other concerns).

SUMMARY

The inventor recognized that it is desirable to implement holographic displays or display systems that are each adapted to combine holographic displays and coarse integral displays to produce or display a coarse integral hologram. However, it is also then desirable to provide a display system or assembly that is useful for combining such displays or display systems to add more detail or information. For example, it is desirable to provide a display system that can be assembled as if it were made up of "holographic bricks" that can be stacked and combined to provide a unique image/output. Briefly, the display system described herein teaches techniques for combining coarse integral holographic (CIH) displays in a seamless and scalable manner (e.g., a display system where multiple spatial light modulators (SLMs) can be placed or provided behind coarse integral optics).

The displays and systems may be thought of as using a method of combining several low pitch, small area spatial light modulators (SLMs) and/or spatially/temporally multiplexing a single SLM to form a modestly sized, wide horizontal field of view display with a small amount of vertical parallax (e.g., providing limited vertical parallax rather than providing an HPO display). The horizontal and vertical information content and fields of view may be adjusted separately.

The SLMs provide a set of fully holographic 3D images, but each with a small area and a small field of view (or "fov"). Each hologram output by the SLMs reproduces a different narrow viewpoint of the same 3D scene. The coarse integral optics angularly tiles the multiple narrow field of view holograms into a single large field of view hologram.

More particularly, a holographic display system is provided that includes an array of holographic display devices each operable to provide a plurality of holographic images of a scene from differing viewpoints of the scene. The display system also includes a periscopic coarse integral optics assembly positioned between the array of holographic display devices and a viewing space for the holographic display system. This assembly includes a periscopic relay for each of the holographic display devices to relay the holographic images. In practice, the periscopic coarse integral optics assembly is typically adapted to combine the plurality of holographic images into a single hologram viewable in a hologram image plane. In some embodiments, the holographic display devices are each a spatial light modulator operable to display one of the plurality of holographic images.

In some embodiments, the periscopic relay includes a field lens adjacent an output surface of a corresponding one of the holographic display devices and further includes a relay lens spaced apart from each of the field lenses. Also, the periscopic coarse integral optics assembly further includes a common transform lens proximate to the relay lenses combining the plurality of holographic images transmitted from the relay lenses. In such cases, the periscopic coarse integral optics assembly may further include a field lens at the hologram image plane, and then the field lens has a height substantially equal to the height of the common transform lens. Further, the common transform lens has a height substantially equal to the height of the array of holographic display devices.

According to another aspect of the description, a scanning periscopic coarse integral holographic display is provided with a scanning relay including: a spatial light modulator providing elemental holograms of a 3D scene; an array of field lenslets; and a scanner operable to direct each of the elemental holograms onto one of the field lenslets. The display further includes a periscopic coarse integral optics assembly positioned between the scanning relay and a viewing space for the holographic display. This assembly includes a periscopic relay for each of the field lenslets to relay the elemental holograms and is adapted to combine the plurality of holographic images into a single hologram viewable in a hologram image plane.

The periscopic relay may include a field lens adjacent an output surface of a corresponding one of the field lenslets of the scanning relay and may further include a relay lens spaced apart from each of the field lenses of the periscopic relay. In these embodiments, the periscopic coarse integral optics assembly further may include a common transform lens proximate to the relay lenses combining the plurality of holographic images transmitted from the relay lenses. Then, the periscopic coarse integral optics assembly may also include a field lens at the hologram image plane. It may be useful for the field lens to have a height substantially equal to the height of the common transform lens, and then the common transform lens may have a height substantially equal to the height of the array of field lenslets in the scanning relay.

Scaling and tiling may be provided in a display assembly. Such a display assembly may include at least two scanning relays each including: a spatial light modulator providing elemental holograms; an array of field lenslets; and a scanner operable to direct each of the elemental holograms onto one of the field lenslets. This display assembly also may include a periscopic coarse integral optics assembly including a periscopic relay for each of the field lenslets. Then, each of the periscopic relays may include a field lens adjacent an output surface of a corresponding one of the field lenslets and further include a relay lens spaced apart from each of the field lenses of the periscopic relay.

Scaling may be provided by configuring the periscopic coarse integral optics assembly to include a common transform lens proximate to the relay lenses combining the plurality of holographic images transmitted from the relay lenses. Further, the periscopic coarse integral optics assembly further includes a field lens at a hologram image plane for the assembly, and the field lens has a height substantially equal to the height of the common transform lens.

Tiling is provided by adapting the periscopic coarse integral optics assembly to further include a transform lens proximate to the relay lenses associated with each of the scanning relays that combines the plurality of holographic images transmitted from the relay lenses of each of the scanning relays. In such a display assembly, the periscopic coarse integral optics assembly further includes a field lens at the hologram image plane, paired with each of the transform lenses. Further, the field lenses each may have a height substantially equal to the height of a corresponding one of the transform lenses.

DETAILED DESCRIPTION

Briefly, the present description provides a display system that combines holographic displays or holographic display systems (sometimes referred to herein as "coarse integral holographic (CIH) displays") such that the CIH displays are tileable and the overall display system is readily scalable. Generally, each of the CIH displays includes a plurality of spatial light modulators (SLMs). The SLMs are arranged in a side-by-side (or planar) manner and may be low pitch, small area SLMs, and the CIH display systems are configured with coarse integral optics (or an optical assembly) to combine the output images or output light (i.e., small area and small field of view (fov) holograms) from the SLMs to form a modestly sized, displayed holographic image (a single larger area hologram with a large fov) with possibly different horizontal and vertical fields of view.

A coarse integral display may include an array of SLMs providing "elemental" 2D images, a lens array, and a large transform lens. Each elemental image in the array of 2D images is of the same scene but from different viewpoints. A lens array is placed in front of the SLMs to receive the array of 2D images, such as with one lens centered over each viewpoint image output from the SLM array. Each image-lens pair becomes or acts, in effect, as a narrow field of view projector, with such projectors' axes all being parallel in a typical implementation.

The large transform lens is selected to act or function to reimage the projectors' images and to bend the projectors' axes so that they cross and fan outward. The 2D images are thereby angularly tiled by the optics or coarse integral optical assembly. This produces a view-dependent image with a wide field of view. However, the views are discrete and discontinuous, and each image is still 2D. An apparent 3D image may be seen, but the coarse integral display does not support accommodation cues for a reasonable number of views.

With this in mind, the SLMs of the array can be operated to provide an array of elemental holographic displays rather than elemental 2D images in the coarse integral display. In this way, each element in the output coarse integral hologram is a narrow field of view 3D hologram that includes all 3D cues including stereopsis, accommodation (focus), and vergence cues. Also, and significantly, the output or produced 3D hologram has continuous horizontal and vertical parallax. The course integral optics are designed to (and do act to) tile the viewpoints of many narrow field of view elemental holographic displays (e.g., SLMs) into a single, large field of view or "super" holographic display. It should also be understood that because the array of elemental 3D holograms provided by the array of SLMs does not need to form a square array, the field of view in the horizontal direction may be different from that of the vertical direction.

With this general understanding of a CIH display understood, it may be useful to discuss exemplary challenges addressed with the display systems of the present description. One main challenge addressed by the present description is how to design and assemble a large holographic display of arbitrary size (which may be labeled or named a "holographic wall"). Conceptually, it was thought that such a display system could be achieved using scalable and tileable component systems/displays that can be labeled or named "holographic bricks." Each holographic brick may be a holographic display in of itself and may include a spatial light modulator (SLM), optics, scanning, and, in some cases, devices for rendering, computational abilities, and connectors. Each holographic brick likely would be scalable such as with multiple SLMs and scanners that may be combined until each holographic brick has reached an optimal or desired field of view and/or size. Multiple holographic bricks may be tiled together, e.g., seamlessly when possible or practical, to create a large holographic display or a larger display system that may be as large as desired for a particular application (i.e., size is no longer a limiting factor in display system design).

As will be understood by those skilled in the arts, a holographic display is unlike a projection or large screen display in that it has to maintain a high pixel density (or pitch) even at large display sizes. The hologram's pixel pitch determines how much a light ray is bent (or diffracted). For example, a pixel pitch of about 0.001 millimeters (mm) deflects a light ray about 30 degrees. The need for having a dense pixel density over the entire large display area is driven by the hologram's pattern of varying pixel pitch, which can direct and focus light to create a three-dimensional (3D) image with a complete set of 3D cues including parallax, stereopsis, and focus.

Unfortunately, it is difficult to create a single large holographic display due to the enormous amounts of information that must be computed and displayed. A space bandwidth product is a measure of the display's information content related to the pixel pitch maintained over a display area. The space bandwidth product of current SLMs, such as a digital micromirror device (DMD), only allows a display that is, for example, 1-inch by 1-inch with a 0.2 degree by 0.2 degree field of view (fov).

Figure 1:
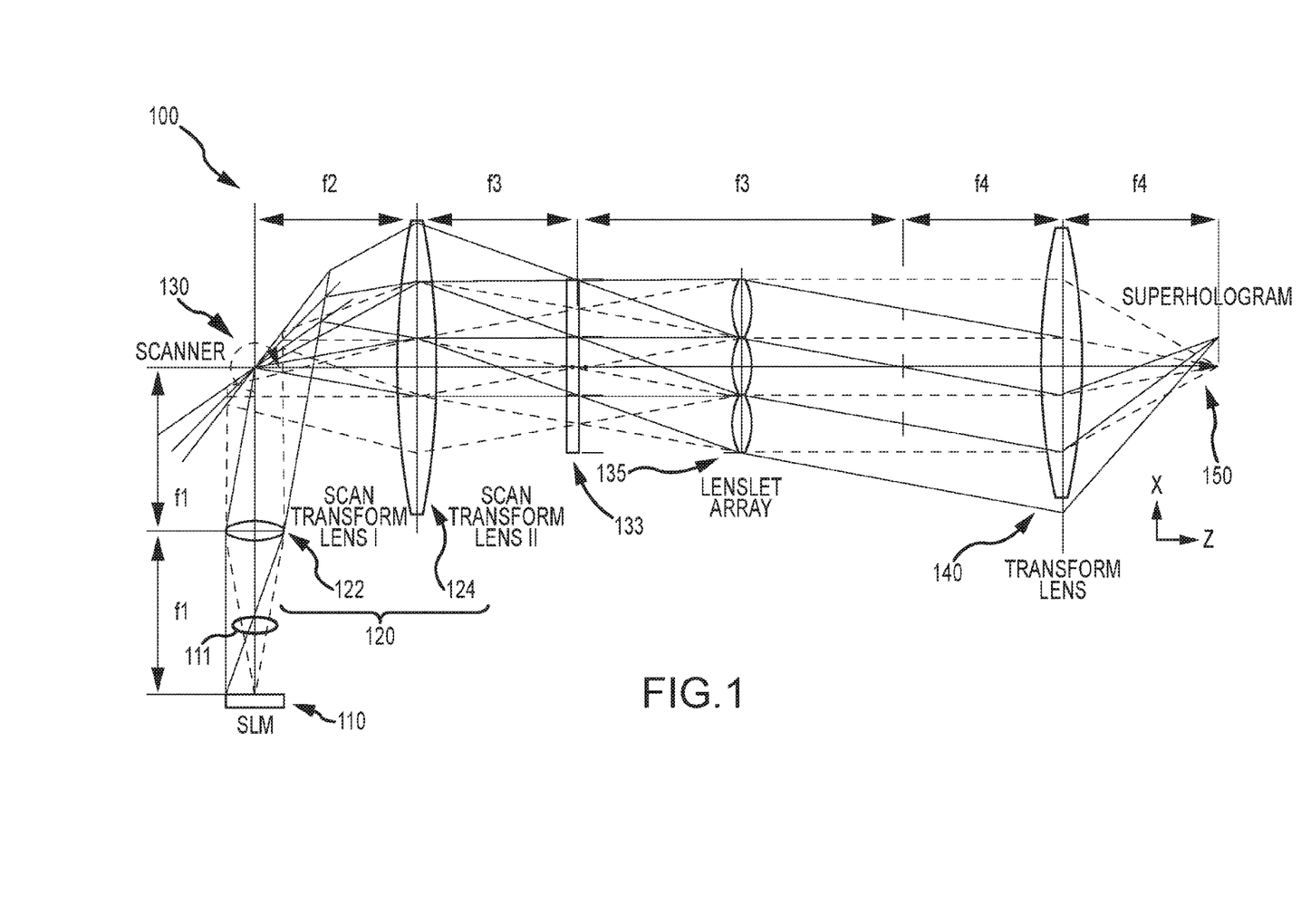
FIG. 1 illustrates a coarse integral display that uses a single image source and scanning to provide an angularly tiled super hologram.

To increase the size of the display from a single SLM, one may try to take advantage of the high speed frame rate of current SLMs (e.g., a DMD may operate at 22,500 frames per second (fps)) and a mirror scanner to distribute multiple images of the SLM. Work has been done to develop a holographic display system that uses a scanned DMD and coarse integral optics (e.g., a lens array and a large transform lens) to create a dynamic hologram. For example, FIG. 1 illustrates a CIH display (or holographic display system) 100 that is operated to provide a super hologram 150 with angularly tiled views (e.g., with crossing optical axes).

As shown, the CIH display 100 includes an SLM 110 and an optical relay (e.g., a 4f relay) 120 with first and second lens 122 and 124, respectively. The CIH display 100 includes a scanner 130 disposed between the first and second lenses 122, 124 such as at the optical relay's Fourier plane. The SLM 110 may be located at the front focal plan of the first lens 122, and the scanner 130 may be located at the rear focal plane of the first lens 122 and at the front focal plane of the second lens 124. The scanned and translated SLM image 133 may be at located at the rear focal plane of the second lens 124. During operation, the SLM 110 rapidly displays elemental holograms 111 that are synchronized to the 2D scanner 130 (and also to the SLM image location).

The scanner 130 is adapted and controlled to spatially tile multiple SLM images 111 behind a lenslet array 135 and large transform lens 140, which act to angularly tile the rapid sequence of elemental holograms 111 generated by the SLM 110 into a super hologram 150.

The system 100 may be operated to create a dynamic hologram 150 that is, for example, a few inches on a side (e.g., 3 inches by 2.25 inches in one working prototype) with a +/−8 degrees by +/−1 degree field of view and a frame rate of about 25 fps. Note, for a modestly sized display with only a few simultaneous viewers, horizontal parallax and field of view (e.g., +/−8 degrees) are generally more important for obtaining an acceptable viewing experience (displayed 3D image) than vertical parallax and field of view (+/−1 degree) since a viewer's eyes and the viewers themselves are typically distributed horizontally relative to the display system 100.

Challenges begin to arise, though, when even a modestly sized display is to be viewed by multiple viewers. In this case, it is preferable or even required that the display system be scaled to provide a larger output image or display output. To this end, it may be desirable and/or useful to combine multiple SLMs together behind a single coarse integral optical system so as to create a display with a larger size and field of view. Unfortunately, the current scanning and optical systems that are available to create the holographic image are larger than the holographic image itself. This problem makes tiling of multiple scanning systems together behind the same coarse integral optic system difficult as large gaps are typically present in the viewing angle.

Figure 2:
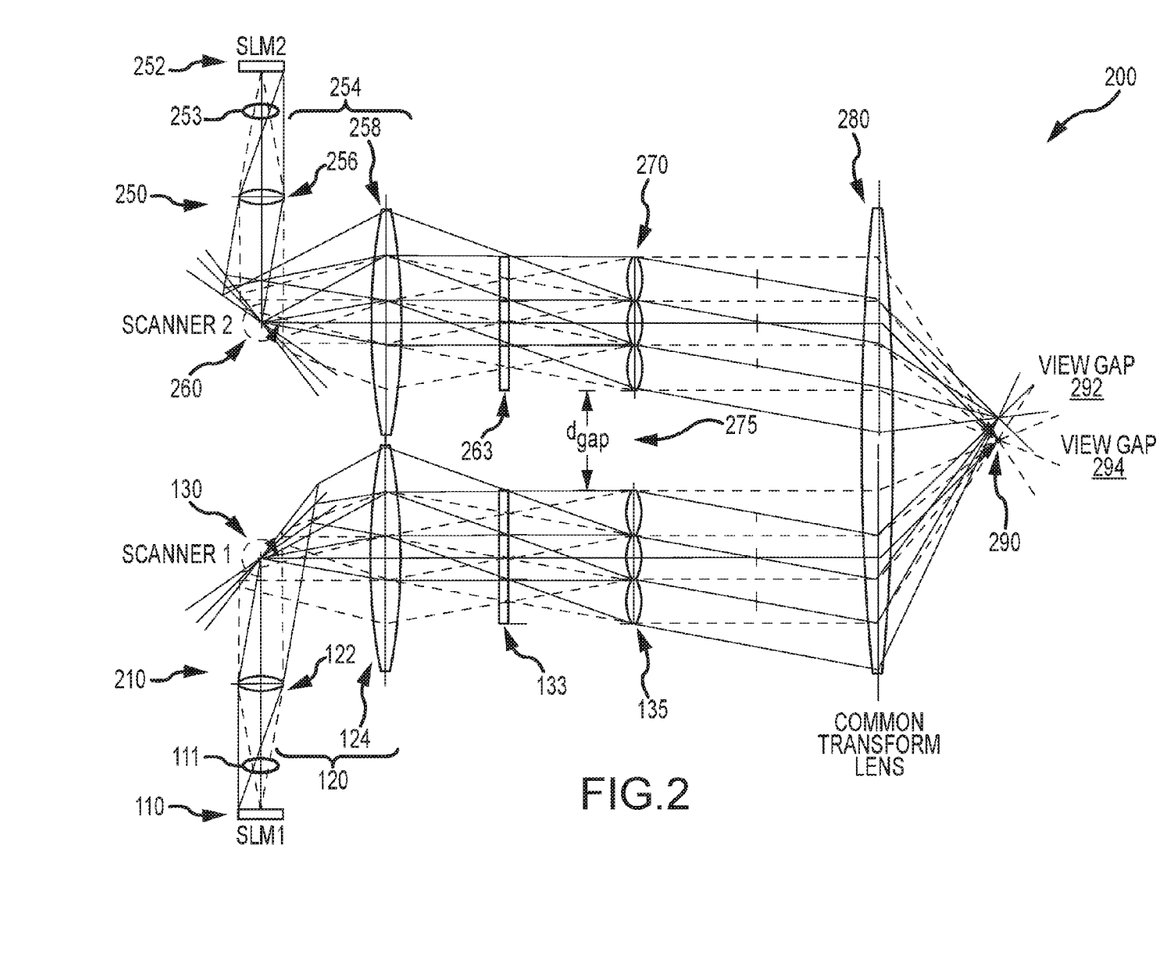
FIG. 2 illustrates a scaled CIH system combining two of the displays of FIG. 1 using a common transform lens so as to provide a super hologram with view gaps.

This problem of combining CIH displays is shown visually with the system 200 of FIG. 2. As shown, a number of components of the CIH display 100 have been provided in subsystem or subassembly 210. Likewise, a second subsystem 250 is stacked onto the subsystem 210. This subsystem 250 includes an SLM 252 and an optical relay (e.g., a 4f relay) 254 with first and second lens 256 and 258, respectively. The CIH display subsystem 250 includes a scanner 260 disposed between the first and second lenses 256, 258 such as at the optical relay's Fourier plane. The SLM 252 may be located at the front focal plan of the first lens 256, and the scanner 260 may be located at the rear focal plane of the first lens 256 and at the front focal plane of the second lens 258. The scanned and translated SLM image 263 may be at located at the rear focal plane of the second lens 258. During operation, the SLM 252 rapidly displays elemental holograms 253 that are synchronized to the 2D scanner 260 (and also to the SLM image location).

The system 200 further includes a common transform lens 280 (larger than lens 140 of display 100 of FIG. 1). The scanners 130 and 260 are adapted and controlled to spatially tile multiple SLM images 111 and 253 behind lenslet arrays 135, 270 and large transform lens 280, which acts to angularly tile the rapid sequence of elemental holograms 111, 253 generated by the SLMs 110, 252 into a super hologram 290. Because the SLM image 263 is smaller than the lens 258 and further because the SLM image 133 is smaller than the lens 124 in the subsystems 210, 250, there is a physical gap, $d_{gap}$, between the two lenslet arrays 135 and 170. Due in part to the gap 275, large gaps 292 and 294 are typically and undesirably present in the viewing angle of the hologram 290 (e.g., the physical gap between the lenslet arrays puts a viewing gap into the image).

Even if a display system is scalable, there eventually will be a limit in the size or expense of available or custom lenses or components. For example, the weight and cost of a lens goes roughly as the diameter cubed. Further, the overall size of the system and interconnects will likely become too cumbersome. At this point, then, it may be preferable and economical to create multiple identical but modestly sized holographic display systems and then spatially tile them together to create a larger display.

Figure 3:
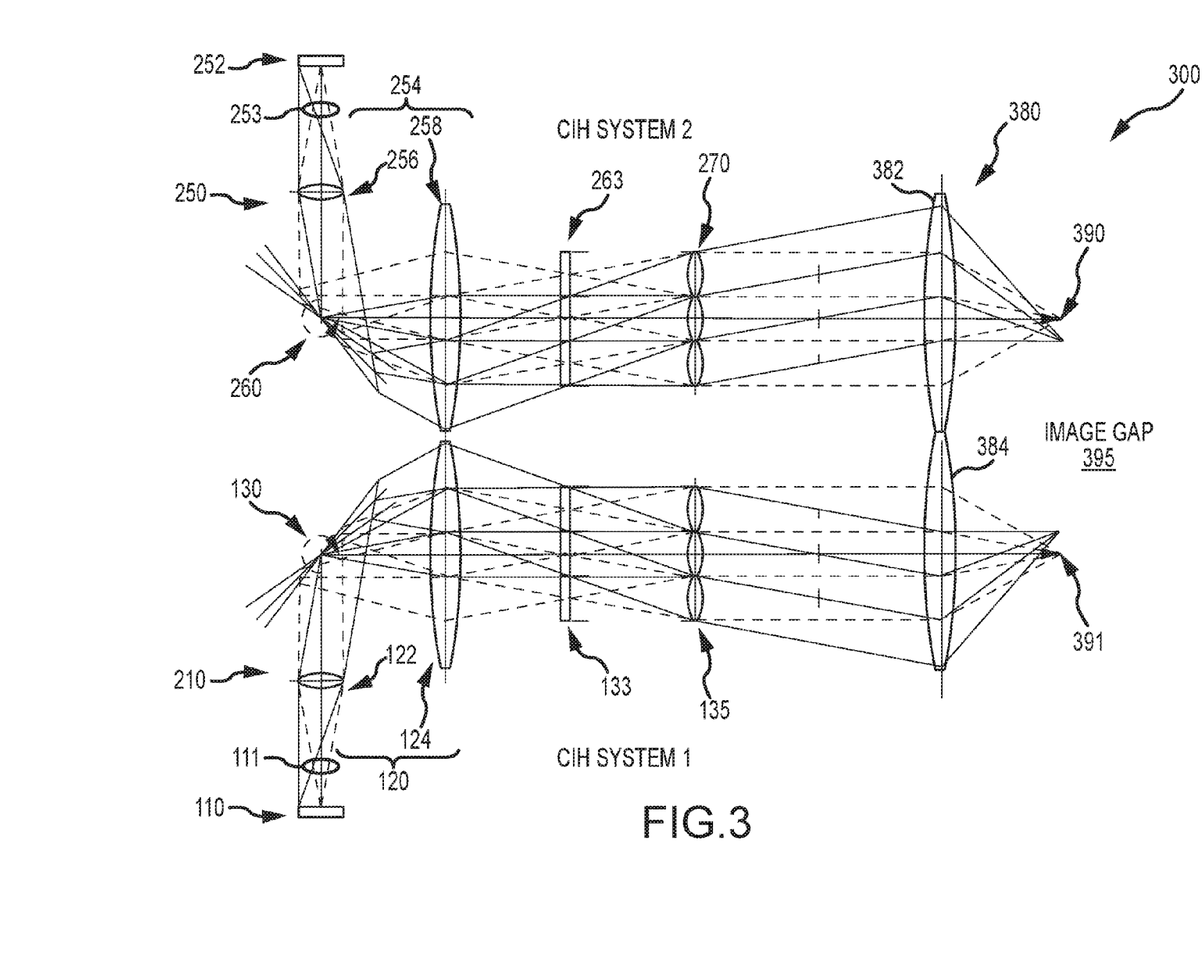
FIG. 3 illustrates a tiled CIH system combining two of the displays of FIG. 2 using two transform lens positioned side-by-side to output super holograms with an image gap.

However, similar to the scaling issues discussed above, it is difficult to tile many modestly sized displays together to form a large display. This difficulty arises, in part, because currently the system to create the holographic display is larger than the holographic image. So, there are large image gaps where the displays meet. This problem is shown in FIG. 3 with a tile CIH system 300 that is formed by tiling subsystems 210, 250 each with their own transform lens 382, 384 (with side-by-side transform lenses 382, 384 providing a transform lens assembly 380). This produces a pair of super holograms 390, 391 that are spaced apart, which undesirably creates an image gap 395 readily observable by viewers of the system 300. Note, subsystems 210 and 250 could be scaled systems with multiple scanners, SLMs, lenslet arrays, and common transform lenses.

Figure 4:
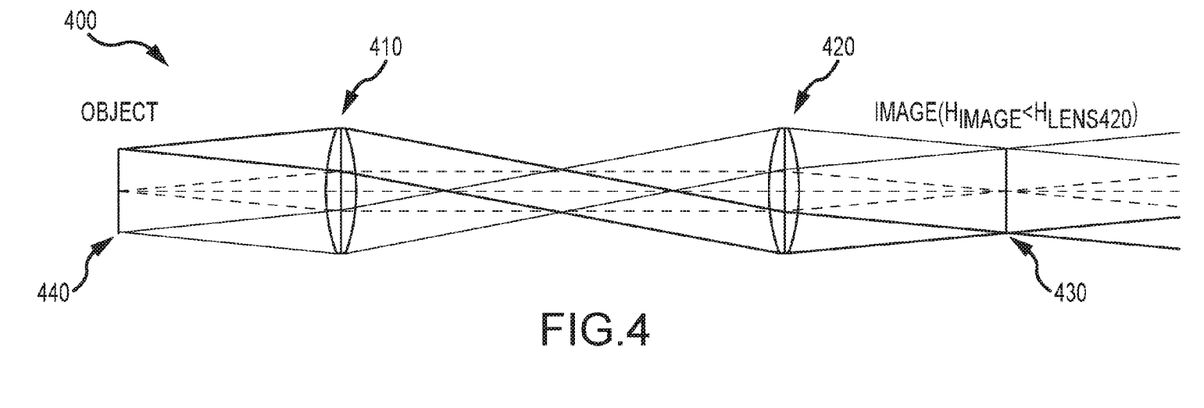
FIG. 4 illustrates relay optics using a lens pair to provide a scanned image.

With the goal of a scalable and tileable holographic display and the above design challenges in mind, it may now be useful to analyze and describe a number of potentially useful and desirable solutions. To make a scalable and tileable display system, the display system preferably is made to be the same size as (or less than) the final image. In the display system 100 of FIG. 1, a scanner 130 tiles multiple images 111 of the SLM 110 behind the coarse integral optics (e.g., elements 120, 130, 135, and 140). Both the scanner and coarse integral optics use variations of relay optics, with the scanner being at the Fourier plane of a relay pair and the coarse integral optics being similar to an array of relay optics with a common final optic. As shown in FIG. 4, standard relay optics 400 may use a pair of relay lenses 410, 420 to display an image 430 of an object 440. As shown, the final lens 420 is larger than the scanned image 430 (i.e., $H_{Image} < H_{Lens420}$) because lens 420 must collect and redirect off-axis views toward the image 430.

Figure 5:
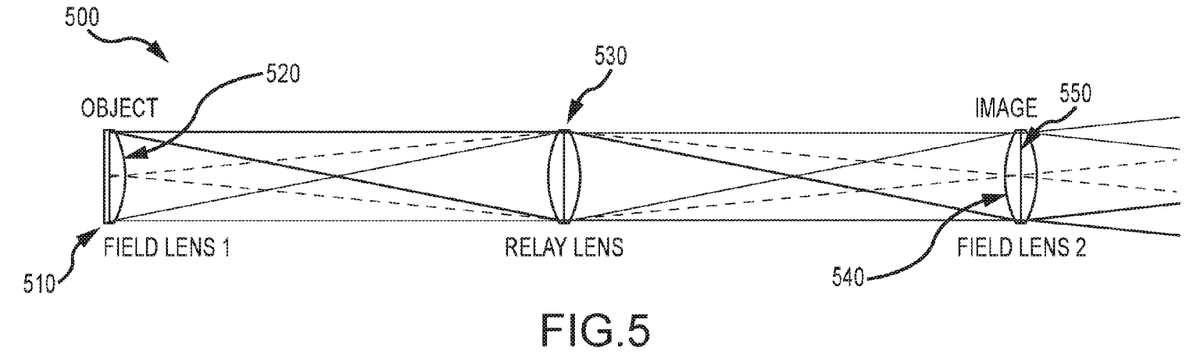
FIG. 5 illustrates relay optics configured in the form of a periscope relay.

One solution identified by the inventor is to use a different form of relay optics. FIG. 5 illustrates relay optics 500 that are configured in the form of a periscope relay, which is a relay system with the smallest tube diameter. Periscope optics 500, as shown, use a field lens 520 to redirect the largest angle of an object 510 parallel to the tube. The periscope optics 500 further use a central relay lens 530 to transfer the image to the other end of the tube. A final large field lens 540 is used to make the system's field of view (fov) symmetric for the image 550. The periscope optics 500 may have to be modified to work with a coarse integral array and with a scanner as well as to magnify the image 550 (e.g., the image 550 has a height or size that matches that of the relay lens 530).

Figure 6:
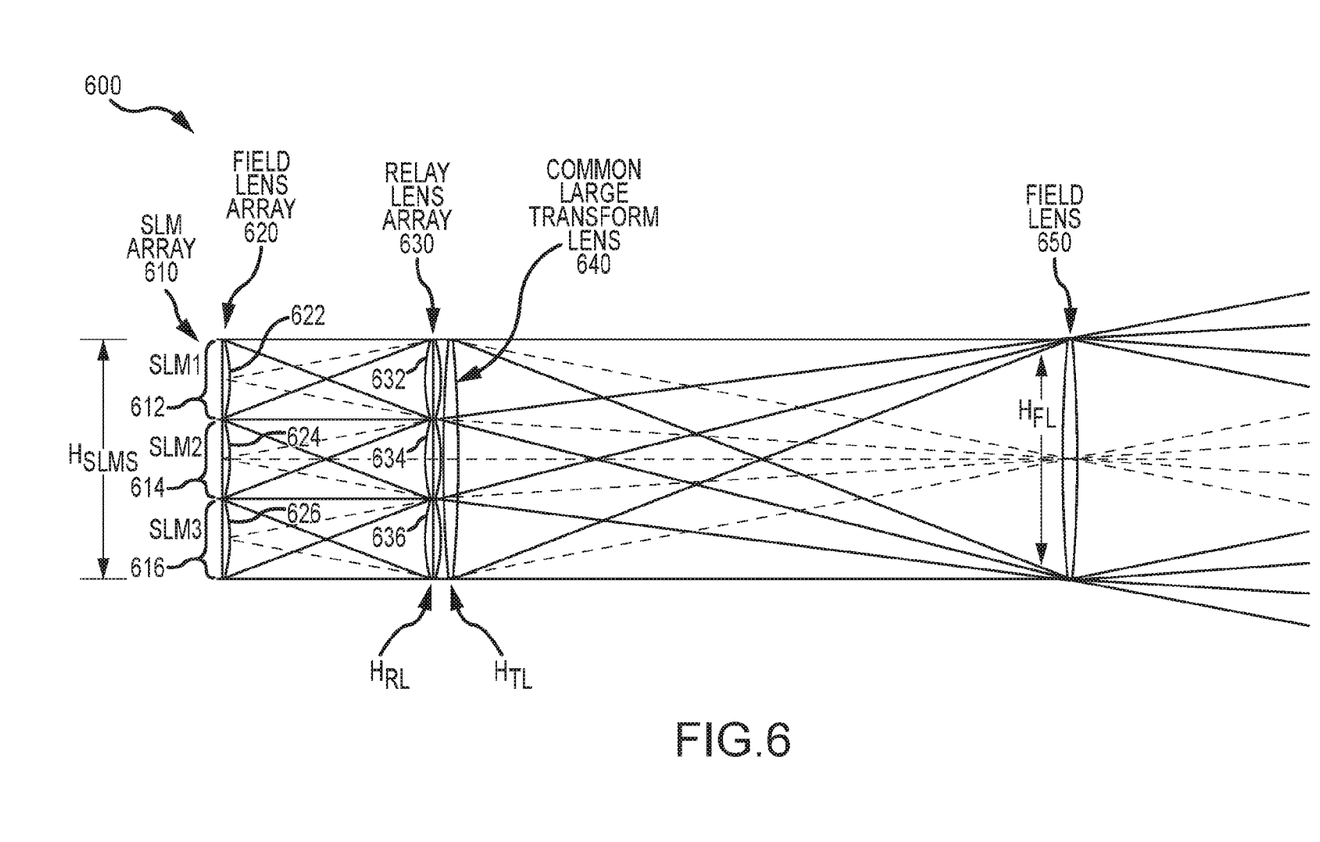
FIG. 6 illustrates a periscopic coarse integral array display according to the present description.

To this end, FIG. 6 illustrates a periscopic coarse integral array display 600 of the present description. In the display 600, there is an array 610 of SLMs 612, 614, 616 (e.g., DMD micro-displays) stacked end-to-end with a height, $H_{SLMS}$. The display 600 further includes a field lens array 620 associated with the SLM array 610 with a field lens 622, 624, 626 paired with or provided for each of the SLMs 612, 614, 616. The display 600 provides a stack or combined array of periscope relay optics, and, to this end, the display 600 includes a relay lens array 630 with a relay lens 632, 634, 636 associated with or paired with the SLM/field lens pairs 612 and 622, 614 and 624, and 616 and 626. The array 630 has a height, $H_{RL}$, that is equal to the height, $H_{SLMS}$, of the SLM array 610. A common large transform lens 640 (with a height, Elm, matching the height, $H_{RL}$, of the relay lens array 630) is positioned between the relay lens array 630 and a second/final large field lens 650, which is associated with image display/output and has a height, $H_{FL}$, equal to the height, $H_{SLMS}$, of the SLM array 610.

The periscopic optic arrays (three shown in display 600 of FIG. 6 formed from the field lenses 622, 624, 626 plus the relay lenses 632, 634, 636) keep the rays from each SLM 612, 614, 616 confined to their bundles. Then, the large transform lens 640, which may be positioned in the display 600 to be in contact with the relay lens array 630, redirects and combines the outputs of the periscopic optic arrays so that these outputs overlap into a final hologram that is the size, $H_{RL}$, of the relay lens array 630 (which is also equal to the height, $H_{SLMS}$, of the SLM array 610) (i.e., $H_{FL}=H_{RL}=H_{SLMS}$) and their fields of view (fovs) tile. A final field lens 650 is provided at the hologram plane (where the hologram is displayed by display system 600) and acts to bend the output views to make the field of view (fov) symmetric about the optical axis.

The hologram provided by display 600 at lens 650 has a fixed image size, and the field of view of the final hologram is the same as the field of view of any one of the SLMs 612, 614, 616. So, the display 600 is useful for creating a much larger hologram than hologram image 550 provided by display 500 (e.g., with a height equal to the combined height, $H_{SLMS}$, of the SLMs 612, 614, 616), but the display 600 still only provides a small fov. For example, it may be desirable to provide a hologram or displayed image with a 30-degree field of view (fov), but each SLM 612, 614, 616 and, therefore, the hologram of display 600 may only have a 2-degree field of view (fov).

Figure 7:
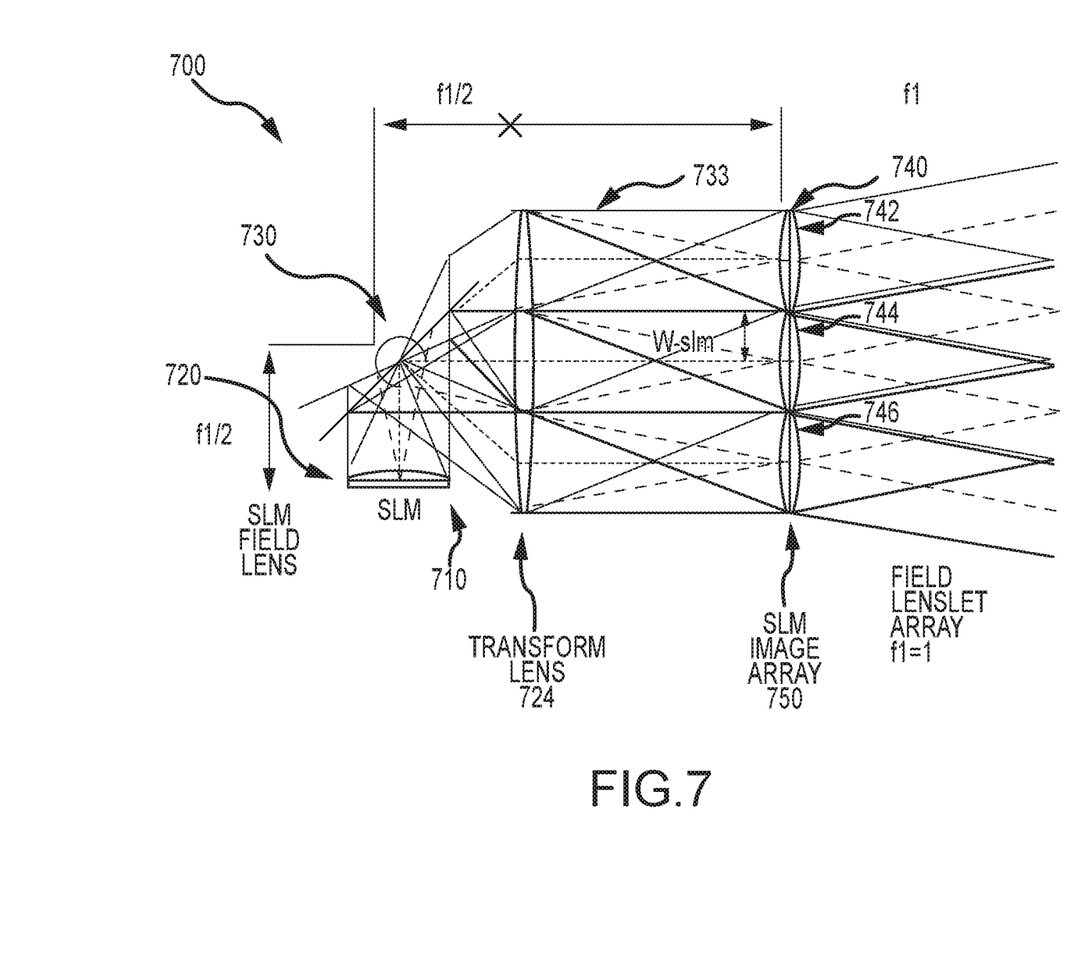
FIG. 7 illustrates a periscopic scanning relay that may be used within a display system such as that of FIG. 6.

As shown in FIG. 1 with display system 100, a single high-speed SLM 110 may be scanned using a scanner 130 at the Fourier plane of a relay system to provide an array of SLM images. The inventor recognized that this concept may be combined with the use of periscopic relay optics to provide a periscopic scanning relay 700 as shown in FIG. 7, which is operable to provide an array of SLM images, which may be provided behind a periscopic coarse integral array rather than requiring use of a stack or array of SLMs as shown in FIG. 6.

The periscopic scanning relay 700 is configured to be similar in function to a periscopic relay in that it confines the ray bundles of images from the single SLM to a minimum tube diameter, which matches the periscopic coarse integral relay's diameter (e.g., the height of the field lenslet array 740). As shown for relay 700 in FIG. 7, a single SLM 710 has an attached field lens 720. A mirror scanner 730 is included in the relay 700 and positioned at the Fourier plane of the field lens 720. During operation, the SLM 710 rapidly displays elemental holograms 733 that are synchronized to the 2D scanner 730 (and also to the SLM image location). A large transform lens 724 reimages the SLM at the image plane shown as SLM image array 750 in FIG. 7. The large transform lens 724 changes the scanner rotation into an SLM image translation. An array 740 of field lenslets 742, 744, 746 makes the field of view (fov) of each of the scanned SLM images in array 750 symmetric about the optical axis.

Figure 8:
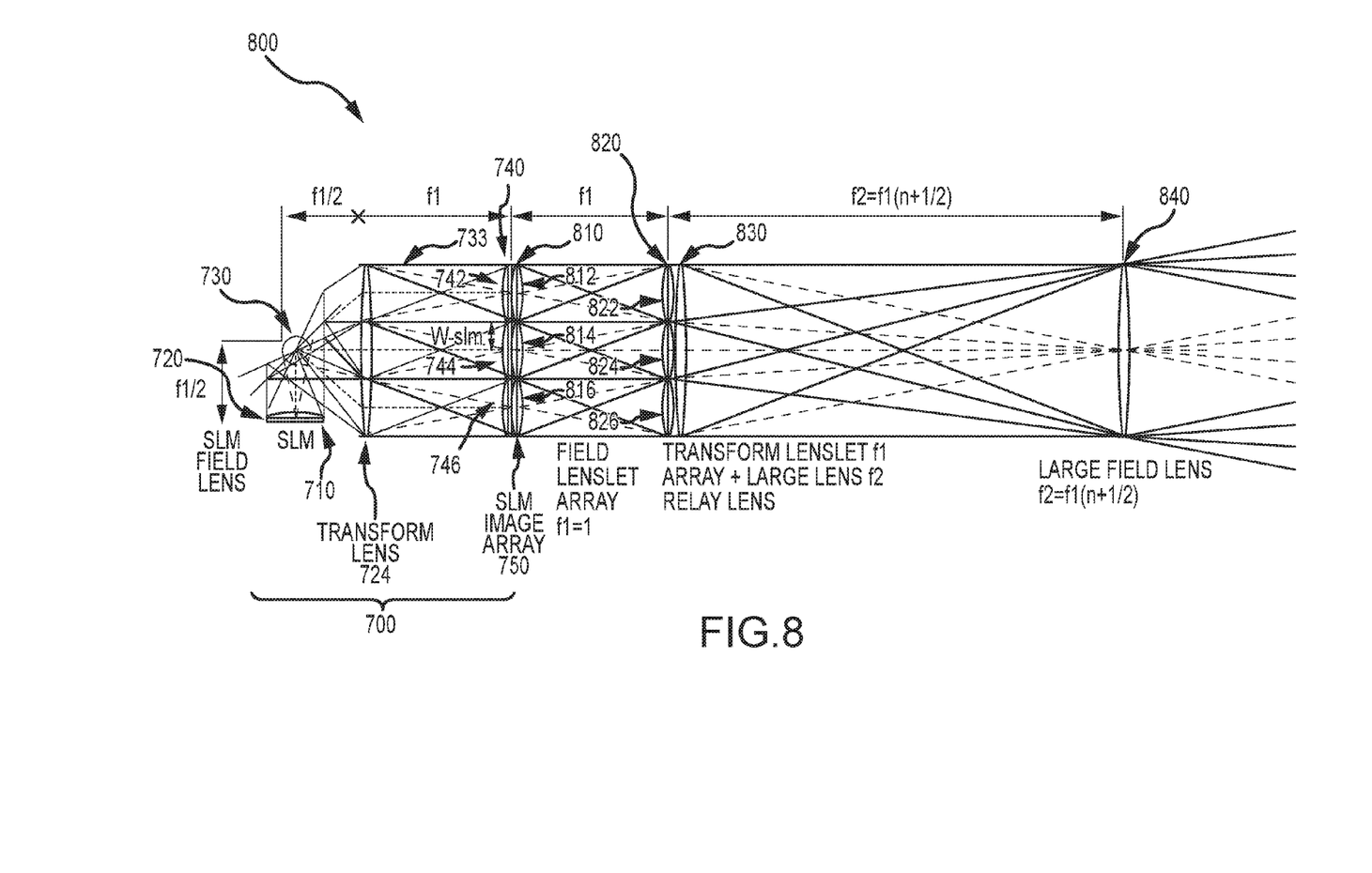
FIG. 8 illustrates a scanning periscopic coarse integral holographic display using the relay of FIG. 7 in combination with the coarse integral array of FIG. 6.

FIG. 8 illustrates a scanning periscopic coarse integral holographic display 800 in which the periscopic scanning relay 700 is provided behind a periscopic integral array, which is formed of: (a) a field lens array 810 of lenses 812, 814, 816 paired with lenses 742, 744, 746 of the array 740 of the scanning relay; (b) a relay lens array 820 including lenses 822, 824, 826 associated with lenses 812, 814, 816, respectively to provide a periscopic relay; (c) a common large transform lens 830 proximate to or contacting the array 820; and (d) a large field lens 840 at the hologram image plane. In the display 800, the array of SLM images 733 from SLM 710 and scanner 730 appears directly behind the periscopic coarse integral array and its components.

The periscopic coarse integral array optics creates a holographic image the size of the array optics (e.g., equal to the height of the field lens 840 which is equal to the height of transform lens 830 which, in turn, is equal to the height of the lens arrays 810 and 820) and with the same field of view (fov) as any one of the SLM images from SLM 710. However, the SLM 710 may have a field of view (fov) that is less than 1 degree. Hence, the scanning system 700 preferably also is configured to demagnify the SLM 710, such as by properly choosing the scanning relay's focal lengths, so its images have a desired field of view (fov) of the final hologram.

Figure 9:
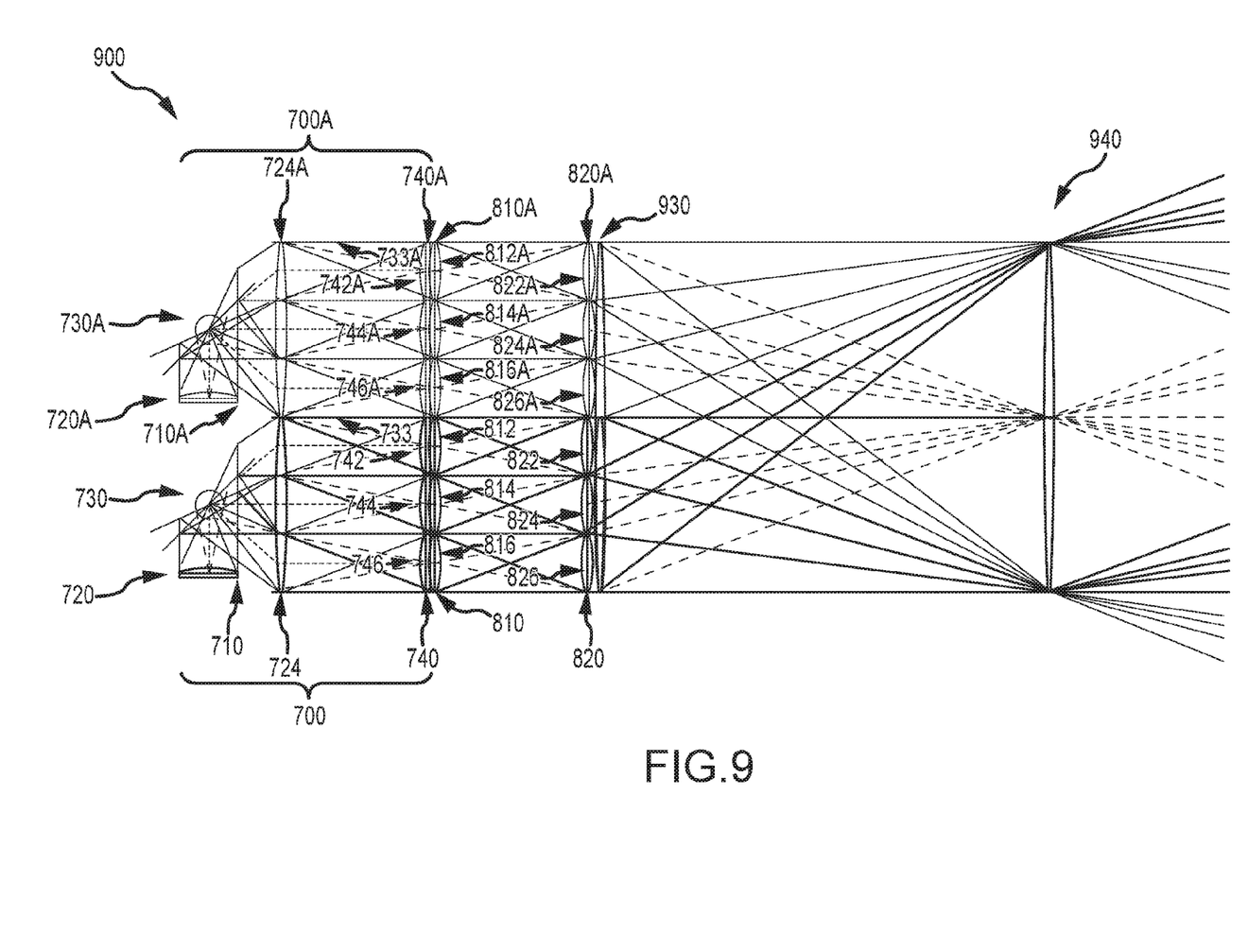
FIG. 9 illustrates a display system providing scaling of the scanning periscopic coarse integral holographic display of FIG. 8.

As shown in FIG. 9, the concepts taught in FIGS. 7 and 8 can be scaled to provide a display system 900 using two or more SLMs (image sources) with matching field and relay lenses behind common transform and field lenses. Particularly, the display system 900 includes a pair of periscopic scanning relays 700 and 700A that each includes components and that each operates as discussed above with reference to FIGS. 7 and 8. The scanning relays 700 and 700A are provided behind a pair of periscopic integral arrays, which are formed of: (a) field lens arrays 810 and 810A with lenses 812, 814, 816 paired with lenses 742, 744, 746 of the array 740 of the scanning relay 700 and with lenses 812A, 814A, 816A paired with lenses 742A, 744A, 746A of the scanning relay 700A and (b) relay lens arrays 820 and 820A including lenses 822, 824, 826 associated with lenses 812, 814, 816, respectively to provide a first periscopic relay and including lenses 822A, 824A, 826A associated with lenses 812A, 814A, 816A to provide a second periscopic relay.

The scaling of a scanning periscopic CIH display is achieved, in part, in display system 900 by providing a common large transform lens 930 (in place of lens 830 in system 800) proximate to or contacting the two arrays 820 and 820A and also by providing a large field lens 940 at the hologram image plane. In the display 900, the array of SLM images 733 and 733A from SLMs 710 and 710A and scanners 730 and 730A appears directly behind the periscopic coarse integral arrays and their components.

Figure 10:
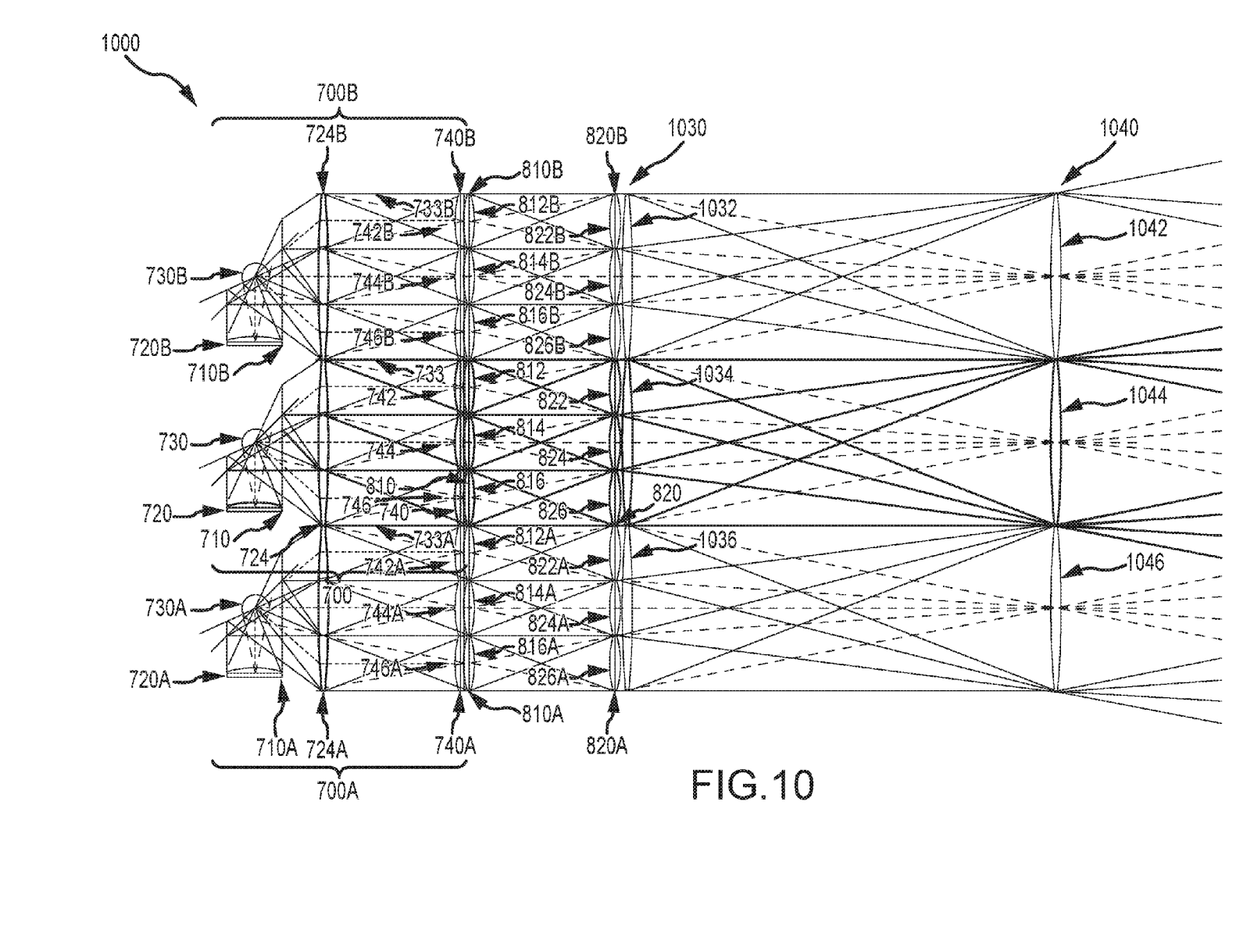
FIG. 10 illustrates a display system providing tiling of the scanning periscopic coarse integral holographic display of FIG. 8.

As shown in FIG. 10, the concepts taught in FIGS. 7 and 8 can also be seamlessly tiled to provide a display system 900 using two, three, or more SLMs (image sources) with matching field and relay lenses behind common transform and field lenses. Particularly, the display system 1000 includes three periscopic scanning relays 700, 700A, and 700B and each includes components and operates as discussed above with reference to FIGS. 7 and 8. The scanning relays 700, 700A, and 700B are provided behind three periscopic integral arrays, which are formed of: (a) field lens arrays 810, 810A, 810B with lenses 812, 814, 816 paired with lenses 742, 744, 746 of the array 740 of the scanning relay 700, with lenses 812A, 814A, 816A paired with lenses 742A, 744A, 746A of the scanning relay 700A, and with lenses 812B, 814B, 816B paired with lenses 742B, 744B, 746B of the scanning relay 700B and (b) relay lens arrays 820, 820A, 820B including lenses 822, 824, 826 associated with lenses 812, 814, 816, respectively to provide a first periscopic relay, including lenses 822A, 824A, 826A associated with lenses 812A, 814A, 816A to provide a second periscopic relay, and including lenses 822B, 824B, 826B associated with lenses 812B, 814B, 816B to provide a third periscopic relay in display system 1000.

The tiling of a scanning periscopic CIH display is achieved, in part, in display system 1000 by providing an array 1030 of transform lenses including common large transform lens 1032 proximate to or contacting the array 820B, common large transform lens 1034 proximate to or contacting the array 820A, and common large transform lens 1036 proximate to or contacting the array 820. Further, tiling is achieved in display system by providing an array 1040 of large field lenses 1042, 1044, 1046 at the plane for the hologram image(s). In the display 1000, the array of SLM images 733, 733A, 733B from SLMs 710, 710A, 710B and scanners 730, 730A, 730B appears directly behind the periscopic coarse integral arrays and their components.

Note, the above display systems are described for use in providing super holograms. However, it will be understood that other images may be provided by the SLMs or other image sources provided behind coarse integral optics. For example, a two-dimensional (2D) multi-view version of a display system may be provided. In this version, elemental 2D images (display devices such as SLMs) are used to give a multi-view image instead of holograms, and the display system may be adapted to provide scanning of 2D images to get 3D images as output from the coarse integral optics, with the scaling and tiling problems handled as described herein.

The SLMs used in the described display systems may take the form of digital mirror devices (DMDs), liquid crystal on silicon (LCOS) devices, optically addressed SLMs (OASLMs), electrically addressed SLMs (EASLMs), or the like. These may each be operated to output an elemental hologram, and these are combined by a coarse integral optical assembly. In some cases, the spacing of the elemental images should be equal to the lenslet width or height to ensure the tiled view zones abut without gaps or overlap. The size of the super hologram may be stated as $D=f_2/f_1 \cdot d$, where $f_2$ is the focal length of the large transform lens. The field of view in one direction of the super hologram is $\phi_{x,y}=n_{x,y} \cdot f_1/f_2 \cdot \theta$, where $n_x$ or $n_y$ is the number of elemental images in that direction. The number of elemental images (i.e., number of SLMs in the array) can be selected to be different in the horizontal and vertical directions (i.e., $n_x$ does not have to equal $n_y$), which can be used to provide different fields of view for a hologram. The resulting hologram may be further demagnified to decrease its image size and increase its field of view (or vice versa) in particular implementations of the system.

A coarse integral holographic display can be used to generate holographic images or super holograms that exhibit full parallax with different fields of view in the horizontal and vertical directions. The super hologram also exhibits accommodation, occlusion, and view-dependent shading. The holographic image may appear to the viewer to be a real image floating in front of or behind the display (e.g., in front of the final field lens).

Based on the inventor's design, it is believed that course integral holographic displays can be built or manufactured to effectively use coarse integral optics. These optics or optical assemblies will allow output images from multiple SLMs to be combined efficiently, which will increase the holographic display's space-bandwidth product (e.g., information capacity). The space-bandwidth product can be flexibly assigned such as more to the horizontal field of view than the vertical field of view. Furthermore, the field of view can be asymmetric, which can be useful in displays that may be normally or often viewed off axis, such as table displays.

Although many SLMs have coarse pitches over small areas, many SLMs are capable of high bandwidth and frame rates, e.g., DMDs are capable of several thousand binary frames per second. Only 15 to 60 frames per second are needed for apparent continuous motion. The additional bandwidth/frames per second can be used to sequentially create multiple elemental holograms with a single SLM, which can then be spatially tiled behind the lens array using 2D scanners and then angularly tiled using the coarse integral optics. The SLM temporally multiplexes the elemental holograms, the 2D scanner spatially multiplexes the elemental holograms, and the coarse integral optics angularly multiplexes the elemental holograms.

The scanning system may include an SLM, a 4f optical relay, and a scanner located at the optical relay's Fourier plane. The SLM is located at the front focal plane of the first lens. The scanner is located at the rear focal plane of the first lens and also the front focal plane of the second lens (scanning on the Fourier plane). The scanned and translated SLM image is located at the rear focal plane of the second lens. The SLM rapidly displays elemental holograms (computed to display holographic images from the appropriate viewpoints) that are synchronized to the 2D scanner and SLM image location. To tile the SLM image without motion blur caused by scanning, the SLM illumination can be flashed when the scanner and SLM image are at the tile locations. The scanner spatially tiles multiple SLM images behind the lenslet array. As with other configurations, a large transform lens is provided for angularly tiling the rapid sequence of elemental holograms generated by the single SLM into a super hologram.

The display systems taught herein may be thought of as providing angular tiling with their coarse integral optics. Such angular tiling has advantages over spatial tiling of SLMs. With spatial tiling, there are noticeable seams in the generated or output holographic image due to gaps between the SLMs from the borders and electronics. Gaps and misalignments in the spatial tiling appear at the hologram plane and visually interfere with and confuse the 3D imagery.

In contrast, with angular tiling as provided by the displays of the present description, the seams appear as gaps in the angular views. Small missing view zones are visually less obtrusive and can further be blended using a light diffuser (not shown in FIG. 1 but readily understood by those skilled in the art). Angular misalignments result in disjointed motion parallax. The angular tiling also lends itself to view-dependent holographic rendering algorithms, such as holographic stereogram and diffraction specific parallax panoramagrams. Further, view-dependent holographic algorithms naturally handle view-dependent lighting and shading, occlusion, and accommodation cues in the holographic images.

With the above description in mind, it may be useful to explain some of these concepts again and/or in more detail to clarify how one may implement a holographic display by combining multiple spatial light modulators to achieve a larger holographic output or 3D displayed image while providing at least some amount of vertical parallax. The proposed solution or display system combines holographic displays with coarse integral displays. The holographic displays (e.g., an array of SLMs) provide a set or array of fully 3D images (e.g., elemental holograms) but with a small area and a low fov. Each of these small holograms is a different (narrow) viewpoint of the same 3D scene. The coarse integral display (or coarse integral optical assembly or optics) combines the multiple narrow field of view holograms into a single large (in size and fov) hologram or "super hologram."

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The display systems described provide a number of advantages over existing systems. Existing display systems attempting to achieve similar results are very expensive (e.g., about $100,000 per 5-inch holographic brick), and this expense is in part due to the use of a ferroelectric shutter array and the use of an OASLM. Tiling may be possible with such a system but it would be prohibitively expensive. Scanning onto an erasable photopolymer presently can only be performed on a 6-inch by 6-inch frame every two seconds, which is much too slow for most applications. Newer screens that use erasable liquid crystal screens are capable of refreshing faster, but they do not have an actual scanning holographic display system to distribute the SLM images onto the screen.

In contrast, the scanning periscopic coarse integral holographic display is scalable (in that it can use multiple SLMs and scanners to increase its size and field of view) and is tileable (in that multiple complete systems can be placed next to each other to increase the size of the display). The system does not need a screen to store the holographic image while the hologram is built up, although it can be used with such a screen (e.g., an OASLM, erasable photopolymer, or other recordable photographic media) to make either a dynamic display or even a holographic printer.

The periscopic scanning coarse integral holographic display builds upon the scanning coarse integral holographic display. A scanning CIH display has been constructed and has proven the concepts described herein. It is likely that an optimized CIH system will be able to achieve a 3-inch by 2.25-inch hologram with +/−8 degrees by +/−1 degree fov at 25 fps from a single digital micro mirror (DMD) SLM and single scanner. The change to the periscopic scanning coarse integral optics is likely useful for keeping the same achievable size from a single SLM, and it should be scalable to multiple scanners and SLMs and tileable to multiple CIH display systems. The scanning periscopic coarse integral holographic display becomes a "holographic brick" that one can use to modularly construct a holographic display of any size, such as to build a holographic wall.

I claim:

1. A holographic display system, comprising:
   an array of holographic display devices operable to provide a plurality of holographic images of a scene from differing viewpoints of the scene; and
   a periscopic coarse integral optics assembly positioned between the array of holographic display devices and a viewing space for the holographic display system, wherein the periscopic coarse integral optics assembly includes a periscopic relay for each of the holographic display devices to relay the holographic images and wherein the periscopic coarse integral optics assembly is adapted to combine the plurality of holographic images into a single hologram viewable in a hologram image plane,
   wherein each of the periscopic relays comprises a field lens adjacent an output surface of a corresponding one of the holographic display devices, and
   wherein each of the periscopic relay further comprises a relay lens spaced apart from each of the field lenses between the field lens and the hologram image plane of the holographic display system.

2. The system of claim 1, wherein each of the holographic display devices comprises a spatial light modulator operable to display one of the plurality of holographic images.

3. The system of claim 1, wherein the periscopic coarse integral optics assembly further includes a common transform lens proximate to the relay lenses combining the plurality of holographic images transmitted from the relay lenses.

4. The system of claim 3, wherein the periscopic coarse integral optics assembly further includes a field lens at the hologram image plane.

5. The system of claim 4, wherein the field lens has a height substantially equal to the height of the common transform lens.

6. The system of claim 5, wherein the common transform lens has a height substantially equal to the height of the array of holographic display devices.

7. A coarse integral holographic display, comprising:
   a scanning relay comprising a spatial light modulator providing elemental holograms of a 3D scene, an array of field lenslets, and a scanner operable to direct each of the elemental holograms onto one of the field lenslets; and
   a periscopic coarse integral optics assembly positioned between the scanning relay and a viewing space for the holographic display, wherein the periscopic coarse integral optics assembly includes a periscopic relay for each of the field lenslets to relay the elemental holograms and wherein the periscopic coarse integral optics assembly is adapted to combine the plurality of holographic images into a single hologram viewable in a hologram image plane,
   wherein the periscopic coarse integral optics assembly further includes a common transform lens between the periscopic relays and the hologram image plane that combines the plurality of holographic images into the single hologram, and
   wherein the common transform lens has a height equal to a height of the array of field lenslets in the scanning relay.

8. The holographic display of claim 7, wherein each of the periscopic relays comprises a field lens adjacent an output surface of a corresponding one of the field lenslets of the scanning relay.

9. The holographic display of claim 8, wherein each of the periscopic relays further comprises a relay lens spaced apart from each of the field lenses of the periscopic relay.

10. The holographic display of claim 9, wherein the common transform lens is positioned proximate to the relay lenses combining the plurality of holographic images transmitted from the relay lenses.

11. The holographic display of claim 10, wherein the periscopic coarse integral optics assembly further includes a field lens at the hologram image plane.

12. The holographic display of claim 11, wherein the field lens has a height equal to the height of the common transform lens.

13. A coarse integral holographic display, comprising:
   a scanning relay comprising a spatial light modulator providing elemental holograms of a 3D scene, an array of field lenslets, and a scanner directing each of the elemental holograms onto one of the field lenslets; and
   a periscopic coarse integral optics assembly between the scanning relay and a viewing space for the holographic display, wherein the periscopic coarse integral optics assembly includes a periscopic relay for each of the field lenslets, wherein the periscopic coarse integral optics assembly combines the holographic images into a super hologram viewable in a hologram image plane, and wherein each of the periscopic relays comprises a field lens adjacent an output surface of a corresponding one of the field lenslets of the scanning relay and further comprises a relay lens spaced apart from each of the field lenses of the periscopic relay between the array of field lenslets and the hologram image plane.

14. The holographic display of claim 13, wherein the periscopic coarse integral optics assembly further includes a common transform lens proximate to the relay lenses combining the plurality of holographic images transmitted from the relay lenses.

15. The holographic display of claim 13, wherein the periscopic coarse integral optics assembly further includes a field lens at the hologram image plane.

16. The holographic display of claim 15, wherein the field lens has a height substantially equal to the height of the common transform lens.

17. The holographic display of claim 16, wherein the common transform lens has a height substantially equal to the height of the array of field lenslets in the scanning relay.

* * * * *